United States Patent
Matsuo

(10) Patent No.: US 10,819,199 B2
(45) Date of Patent: Oct. 27, 2020

(54) WINDING APPARATUS

(71) Applicant: TOYOTA JIDOSHA KABUSHIKI KAISHA, Toyota-shi, Aichi-ken (JP)

(72) Inventor: Tsuyoshi Matsuo, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 210 days.

(21) Appl. No.: 16/035,755

(22) Filed: Jul. 16, 2018

(65) Prior Publication Data
US 2019/0052156 A1 Feb. 14, 2019

(30) Foreign Application Priority Data

Aug. 10, 2017 (JP) ................................. 2017-155558

(51) Int. Cl.
| | |
|---|---|
| *H02K 15/04* | (2006.01) |
| *H01F 41/061* | (2016.01) |
| *H01F 41/082* | (2016.01) |
| *B21F 3/00* | (2006.01) |
| *H01F 41/071* | (2016.01) |

(52) U.S. Cl.
CPC .............. *H02K 15/045* (2013.01); *B21F 3/00* (2013.01); *H01F 41/061* (2016.01); *H01F 41/082* (2016.01); *H01F 41/071* (2016.01)

(58) Field of Classification Search
CPC .............. H02K 15/04; H02K 15/0435; H02K 15/0442; H02K 15/045; H01F 41/06; H01F 41/061; H01F 41/074; H01F 41/082; Y10T 29/49071; B21F 3/04; B21F 3/00

See application file for complete search history.

(56) References Cited

U.S. PATENT DOCUMENTS

| | | | |
|---|---|---|---|
| 8,371,340 B2 * | 2/2013 | Fubuki ................. | H01F 41/071 140/102 |
| 9,082,547 B2 * | 7/2015 | Yoshimori ............. | H01F 5/00 |
| 9,197,107 B2 * | 11/2015 | Okumura .............. | H02K 3/18 |
| 9,287,743 B2 * | 3/2016 | Fubuki ................. | H02K 3/18 |
| 9,762,108 B2 * | 9/2017 | Sakamoto ............ | H02K 15/045 |

(Continued)

FOREIGN PATENT DOCUMENTS

| | | |
|---|---|---|
| JP | 2009-135222 A | 6/2009 |
| JP | 2010-273485 A | 12/2010 |
| JP | 2013-247709 A | 12/2013 |

*Primary Examiner* — Edward T Tolan
(74) *Attorney, Agent, or Firm* — Sughrue Mion, PLLC

(57) ABSTRACT

A winding apparatus 23 forms a rectangle-tubular edgewise coil 1 by alternately repeating bending of a rectangular conductor 2 in a clockwise direction in a plan view in an edgewise manner and feeding of the rectangular conductor 2. The winding apparatus 23 includes a bending jig 31 configured to bend the rectangular conductor 2, five sway-prevention guides 50 arranged at regular intervals on the same circumference to prevent the edgewise coil 1 from losing its shape, the five sway-prevention guides 50 being configured so that when the rectangular conductor 2 is bent in the edgewise manner, the edgewise coil 1 is sandwiched between two adjacent ones of the five sway-prevention guides 50 in the clockwise direction, and a guide holding member 51 configured to be rotationally driven in synchronization with the bending of the rectangular conductor 2 in the edgewise manner and the feeding of the rectangular conductor 2.

7 Claims, 9 Drawing Sheets

(56) References Cited

U.S. PATENT DOCUMENTS

| | | | |
|---|---|---|---|
| 2008/0223974 A1* | 9/2008 | Ueki | B65H 55/04 242/433 |
| 2010/0180977 A1 | 7/2010 | Sugishima | |
| 2012/0086298 A1* | 4/2012 | Fubuki | H02K 3/18 310/208 |
| 2015/0270763 A1 | 9/2015 | Sakamoto et al. | |

* cited by examiner

WINDING APPARATUS

CROSS REFERENCE TO RELATED APPLICATIONS

This application is based upon and claims the benefit of priority from Japanese patent application No. 2017-155558, filed on Aug. 10, 2017, the disclosure of which is incorporated herein in its entirety by reference.

BACKGROUND

The present disclosure relates to a winding apparatus.

Patent Literature 1 (Japanese Unexamined Patent Application Publication No. 2013-247709) discloses a winding method for an edgewise coil. Specifically, when an edgewise coil is formed, it is necessary to intermittently rotate the edgewise coil. However, there are cases in which because of this intermittent rotation, the shape of the edgewise coil collapses due to inertia. To cope with this problem, in Patent Literature 1, four guides are arranged so as to surround an edgewise coil in order to prevent the edgewise coil from losing its shape, so that when the edgewise coil is rotated, one of the guides supports a side of the edgewise coil facing in a rotational direction.

SUMMARY

Recently, it has been desired to further increase the speed of the manufacturing process for edgewise coils. However, in the configuration disclosed in the above-mentioned Patent Literature 1, since a gap between adjacent guides is large, it is impossible to sufficiently prevent edgewise coils from losing their shapes.

An object of the present disclosure is to provide a technique for preventing an edgewise coil from losing its shape in forming the edgewise coil.

A first exemplary aspect is a winding apparatus configured to form a rectangle-tubular edgewise coil by alternately repeating bending of a rectangular conductor in a predetermined direction in an edgewise manner and feeding of the rectangular conductor, including: a bending jig disposed so as to be able to come into contact with an outer side surface of the rectangular conductor, the bending jig being configured to be driven in the predetermined direction and thereby to bend the rectangular conductor in the edgewise manner; five sway-prevention guides arranged at regular intervals on the same circumference to prevent the edgewise coil from losing its shape, the five sway-prevention guides being configured so that when the rectangular conductor is bent in the edgewise manner, the edgewise coil is sandwiched between two adjacent ones of the five sway-prevention guides in the predetermined direction; and a guide holding member configured to hold the five sway-prevention guides and to be rotationally driven in synchronization with the bending of the rectangular conductor in the edgewise manner and the feeding of the rectangular conductor. According to the above-described configuration, when the rectangular conductor is bent in the edgewise manner, a gap between the two sway-prevention guides sandwiching the edgewise coil therebetween in the predetermined direction is small. Therefore, it is possible to effectively prevent the edgewise coil from losing its shape in forming the edgewise coil.

The edgewise coil preferably has two long-side outer side surfaces and two short-side outer side surfaces as its outer side surfaces. Further, when the rectangular conductor is bent in the edgewise manner, the two sway-prevention guides are preferably opposed to and able to come into contact with the two long-side outer side surfaces of the edgewise coil.

When the rectangular conductor is fed along a long-side outer side surface of the edgewise coil, the edgewise coil is preferably inserted between other two sway-prevention guides different from the two sway-prevention guides that had sandwiched the edgewise coil therebetween before the feeding.

When the rectangular conductor is fed along a long-side outer side surface of the edgewise coil, the edgewise coil is preferably inserted between other two sway-prevention guides that are adjacent in a direction opposite to the predetermined direction to the two sway-prevention guides that had sandwiched the edgewise coil therebetween before the feeding.

Each of the sway-prevention guides is preferably configured so as to be able to retract in a radially-outward direction. According to the above-described configuration, when the rectangular conductor is fed along the long-side outer side surface of the edgewise coil, the edgewise coil is smoothly inserted between the other two sway-prevention guides without a hitch. Further, the configuration in which each of the sway-prevention guides can retreat in the radially-outward direction does not hamper the effect of effectively preventing the edgewise coil from losing its shape in forming the edgewise coil.

Each of the sway-prevention guides is preferably configured so as to be able to swing in the radially-outward direction and thereby to retract in the radially-outward direction.

The winding apparatus preferably further includes returning means for returning each of the sway-prevention guides from a state in which it has swung in the radially-outward direction.

A rotation axis of the guide holding member preferably coincides with an intersection line on which imaginary extension planes of two inner side surfaces sandwiching a bent part at which the rectangular conductor is bent in the edgewise manner intersect each other.

According to the present disclosure, it is possible to prevent an edgewise coil from losing its shape in forming the edgewise coil.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Preferred embodiments according to the present disclosure are explained hereinafter with reference to the drawings.

(Edgewise Coil)

Figure 1:
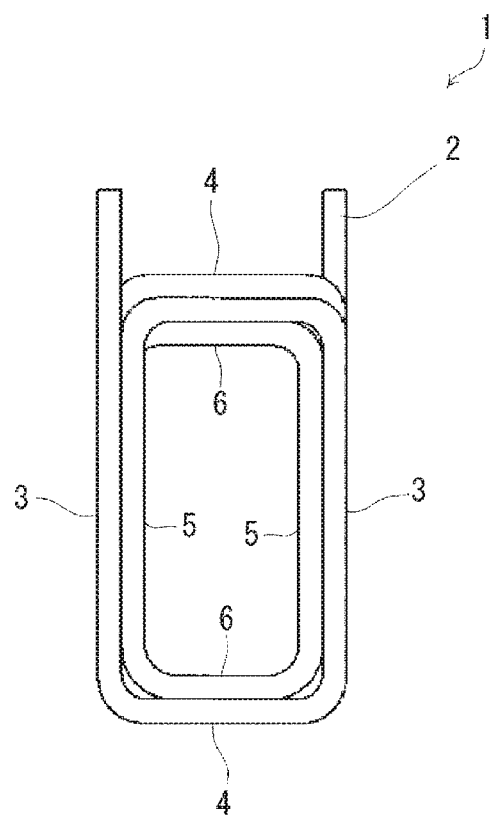
FIG. 1 is a front view of an edgewise coil.
Figure 2:
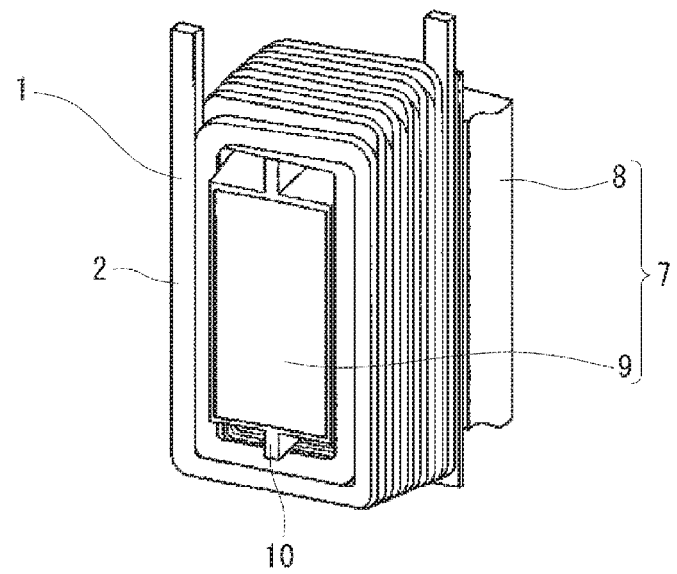
FIG. 2 is a partial perspective view of a stator.

Firstly, an edgewise coil 1 is described with reference to FIGS. 1 and 2. As shown in FIGS. 1 and 2, in this embodiment, the edgewise coil 1 is formed into a roughly rectangle-tubular shape by bending a rectangular conductor 2 in an edgewise manner (hereinafter also expressed as "by edgewise-bending a rectangular conductor 2"). The edgewise coil 1 is formed by laminating (i.e., bending) the rectangular conductor 2 into multiple layers in the thickness direction of the rectangular conductor 2. As shown in FIG. 1, the edgewise coil 1 has two long-side outer side surfaces 3 and two short-side outer side surfaces 4 as its outer side surfaces. The edgewise coil 1 has two long-side inner side surfaces 5 and two short-side inner side surfaces 6 as its inner side surface. The two long-side outer side surfaces 3 and the two short-side outer side surfaces 4 constitute the outer side surfaces of the edgewise coil 1. Similarly, the two long-side inner side surfaces 5 and the two short-side inner side surfaces 6 constitute the inner side surfaces of the edgewise coil 1.

FIG. 2 shows a stator core 7 formed by laminating electromagnetic steel plates. The stator core 7 has an annular core main body 8 and a plurality of teeth 9 protruding from the core main body 8 in a radially-inward direction. Further, each edgewise coil 1 is attached to a respective tooth 9 with an insulator 10 interposed therebetween.

(Winding Machine)

Figure 3:
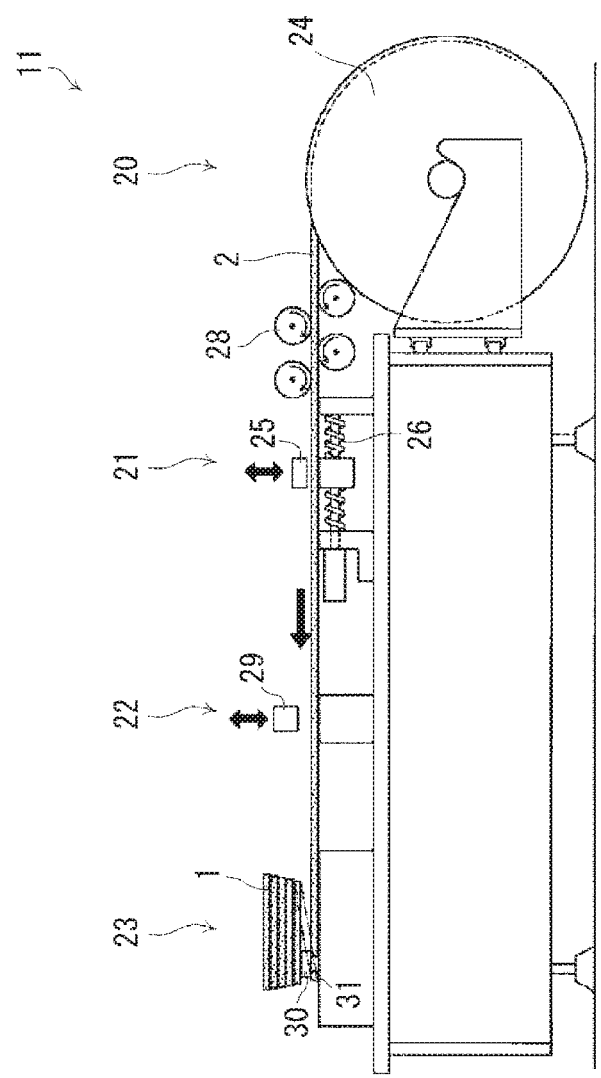
FIG. 3 is a schematic diagram of a winding machine.

Next, a winding machine 11 for manufacturing edgewise coils 1 is described with reference to FIGS. 3 to 7. As shown in FIG. 3, the winding machine 11 includes a bobbin holding apparatus 20, a feeding apparatus 21, a holding apparatus 22, and a winding apparatus 23.

The bobbin holding apparatus 20 is configured to be able to hold a bobbin 24 around which the rectangular conductor 2 is wound in a flatwise direction.

The feeding apparatus 21 includes a feeding clamp 25 and a rack-and-pinion 26. The feeding clamp 25 is configured to be able to clamp the rectangular conductor 2. By horizontally moving the feeding clamp 25 a predetermined distance by using the rack-and-pinion 26 while the rectangular conductor 2 is being clamped by the feeding clamp 25, the rectangular conductor 2 is transferred toward the edgewise coil 1 the predetermined distance. At the same time, the rectangular conductor 2 is pulled out from the bobbin 24 by an amount corresponding to the aforementioned predetermined distance. The rectangular conductor 2 pulled out from the bobbin 24 is straightened by straightening rollers 28.

The holding apparatus 22 includes a holding clamp 29. The holding apparatus 22 holds the rectangular conductor 2 by using the holding clamp 29 so that the rectangular conductor 2 does not move when the feeding apparatus 21 is not clamping the rectangular conductor 2.

The winding apparatus 23 is an apparatus that edgewise-bends the rectangular conductor 2. Specifically, the winding apparatus 23 forms a rectangle-tubular edgewise coil 1 by alternately repeating edgewise-bending of the rectangular conductor 2 in a predetermined direction and feeding of the rectangular conductor 2. The winding apparatus 23 includes a center post 30 and a bending jig 31. Further, the bending jig 31 rotates around the center post 30 in a predetermined direction while the rectangular conductor 2 is being clamped by the center post 30. As a result, the rectangular conductor 2 is edgewise-bent.

In the above-described configuration, when the rectangular conductor 2 is edgewise-bent, the rectangular conductor 2 is clamped by the holding clamp 29 of the holding apparatus 22 and also clamped by the center post 30 of the winding apparatus 23, but is not clamped by the feeding clamp 25 of the feeding apparatus 21. In contrast, when the rectangular conductor 2 is fed (i.e., transferred), the rectangular conductor 2 is clamped by neither the holding clamp 29 of the holding apparatus 22 nor the center post 30 of the winding apparatus 23, but is clamped by the feeding clamp 25 of the feeding apparatus 21.

Figure 4:
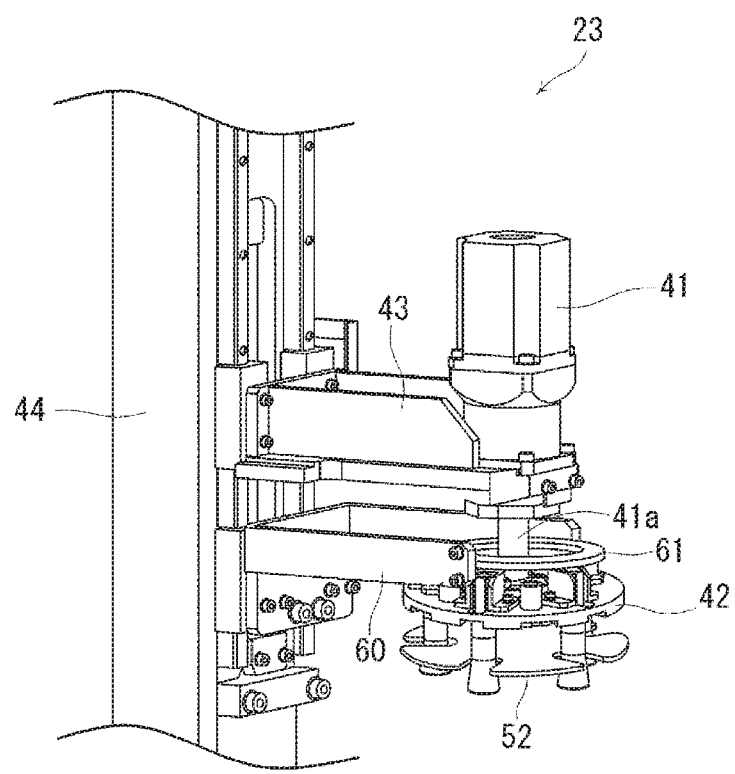
FIG. 4 is a side view of the winding apparatus.

As shown in FIG. 4, the winding apparatus 23 further includes a rotation motor 41 and a guide unit 42.

The rotation motor 41 is supported by a support pillar 44 with a motor bracket 43 interposed therebetween.

The guide unit 42 is provided to prevent an edgewise coil 1 from losing its shape in forming the edgewise coil 1. The guide unit 42 is attached to an output shaft 41a of the rotation motor 41. By the above-described configuration, the guide unit 42 is rotationally driven by the rotation motor 41. The guide unit 42 horizontally rotates at a fixed height without moving up or down. The guide unit 42 is described hereinafter in detail with reference to FIG. 5.

Figure 5:
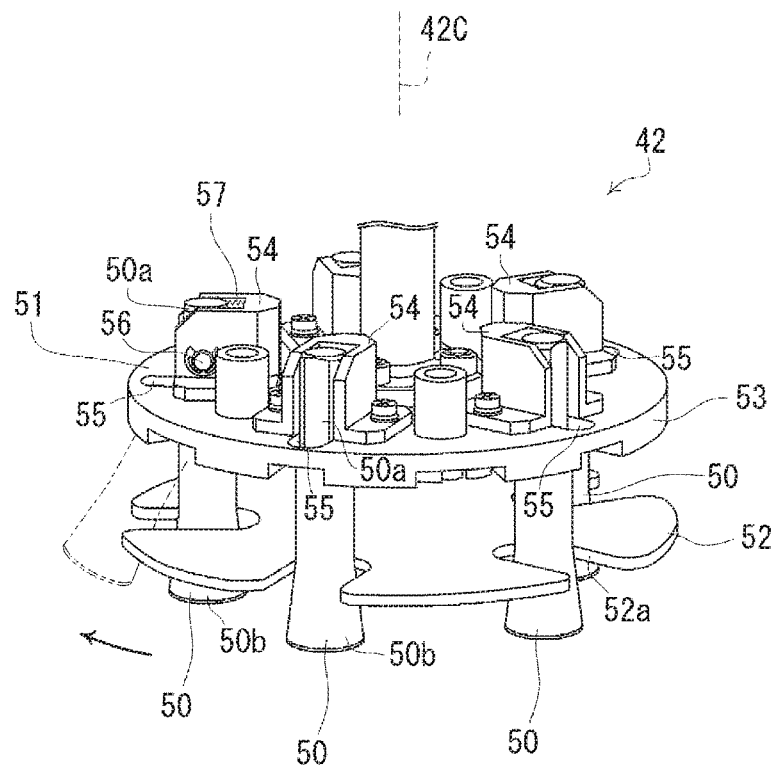
FIG. 5 is a perspective view of a guide unit.

FIG. 5 shows a perspective view of the guide unit 42. As shown in FIG. 5, the guide unit 42 includes five sway-prevention guides 50, a guide holding member 51, and a height restraining plate 52. The guide unit 42 further has a rotation axis 42C around which the guide unit 42 horizontally rotates. In the following description, a radial direction and a circumferential direction of the guide unit 42 are simply referred to as a radial direction and a circumferential direction, respectively.

The five sway-prevention guides 50 are arranged at regular intervals on the same circumference (i.e., one circumference) in a plan view. That is, each of the sway-prevention guides 50 is disposed at a place corresponding to a respective one of the vertexes of a regular pentagon. The five sway-prevention guides 50 are arranged at places equidistant from the rotating axis 42C of the guide unit 42 in the radial direction. Each of the sway-prevention guides 50 is formed in a cylindrical shape extending in the vertical direction. Each of the sway-prevention guides 50 has an upper end 50a and a lower end 50b. Each of the sway-prevention guides 50 is formed in such a manner that its thickness slightly increases toward the lower end 50*b*.

The guide holding member 51 includes a horizontal plate 53 and five support brackets 54.

In the horizontal plate 53, five guide insertion holes 55, which are arranged at regular intervals on the same circumference in the plan view, are formed. Each of the guide insertion holes 55 is formed so as to penetrate the horizontal plate 53 in the vertical direction. Each of the guide insertion holes 55 is formed so that it is oblong in the radial direction.

Each of the support brackets 54 is attached to the upper surface of the horizontal plate 53 and is disposed at a place corresponding to a respective one of the guide insertion holes 55. Each of the support brackets 54 is formed in a roughly U-shape in the plan view and is opened toward a radially-outward direction. Each of the support brackets 54 is provided with a swing shaft 56 that passes through the internal space of the opening. The swing shaft 56 of each support bracket 54 extends in a direction perpendicular to the radial direction and the vertical direction.

Further, the sway-prevention guides 50 are inserted into the respective guide insertion holes 55. The upper end 50*a* of each sway-prevention guide 50 protrudes upward beyond the horizontal plate 53. The swing shaft 56 of each support bracket 54 passes through (i.e., extends into) the upper end 50*a* of a respective one of the sway-prevention guides 50. Therefore, as indicated by chain double-dashed lines and a thick arrow in FIG. 5, each of the sway-prevention guides 50 is supported by the guide holding member 51 so that it can swing around the swing shaft 56 of a respective one of the support brackets 54. Specifically, each of the sway-prevention guides 50 is configured to be able to swing toward the radially-outward direction. Each of the sway-prevention guides 50 is configured to be able to retreat toward the radially-outward direction. The lower end 50*b* of each sway-prevention guide 50 is configured so that it can be displaced in the radially-outward direction. Each of the sway-prevention guides 50 can swing in a determined range between a state in which the sway-prevention guide 50 extends in the vertical direction as indicated by solid lines in FIG. 5 and a state in which the sway-prevention guide 50 has swung in the radially-outward direction as indicated by chain double-dashed lines in FIG. 5. Further, each of the support brackets 54 further includes a compression coil spring 57 as returning means for returning a respective one of the sway-prevention guides 50 from the state in which the sway-prevention guide 50 has swung in the radially-outward direction to the state in which the sway-prevention guide 50 extends in the vertical direction. The compression coil spring 57 is disposed so as to continuously press an upper part of the upper end 50*a* of each sway-prevention guide 50 that is located above the swing shaft 56 in the radially-outward direction. However, each of the support brackets 54 may include, instead of the compression coil spring 57, a tension coil spring as the returning means. In this case, the tension coil spring is disposed so as to continuously pull a lower part of each sway-prevention guide 50 that is located below the swing shaft 56 in the radially-inward direction. Note that each of the sway-prevention guides 50 cannot swing in the circumferential direction. That is, each of the sway-prevention guides 50 cannot retract in the circumferential direction.

The height restraining plate 52 is disposed on the upper-end side of the edgewise coil 1 (i.e., disposed above the edgewise coil 1) so that it prevents the shape of the edgewise coil 1 from collapsing upward. In the height-restraining plate 52, five guide insertion grooves 52*a*, which open toward the radially-outward direction, are formed. The five guide insertion grooves 52*a* are formed at regular intervals along the circumferential direction. The five sway-prevention guides 50 are inserted into the five guide insertion grooves 52*a*, respectively. The height restraining plate 52 rotates together with the guide unit 42 and cannot rotate relative to the guide unit 42. Further, the height restraining plate 52 is supported on the guide unit 42 by, for example, a shaft or the like extending in the vertical direction (not shown) so that it can move up and down relative to the guide unit 42. As shown in FIG. 4, the height restraining plate 52 is supported by the support pillar 44 with a plate support bracket 60 interposed therebetween. Further, as the plate support bracket 60 is moved up or down by an actuator (not shown), the height restraining plate 52 moves up or down in a similar manner. As the process of forming the edgewise coil 1 progresses, the height of the edgewise coil 1 increases. Therefore, as the process of forming the edgewise coil 1 progresses, the height restraining plate 52 is driven upward. In this way, the height restraining plate 52 can effectively prevent the shape of the edgewise coil 1 from collapsing upward without hampering the formation of the edgewise coil 1.

Note that in FIG. 4, the height restraining plate 52 is connected to a support ring 61 so that it cannot move relative to the support ring 61. That is, the height restraining plate 52 and the support ring 61 simultaneously move up or down, and simultaneously rotate. The support ring 61 is supported by the plate support bracket 60 so that the support ring 61 is horizontally rotatable. The support ring 61 is supported by the plate support bracket 60 through, for example, a cam or the like so that the support ring 61 cannot move up or down relative to the plate support bracket 60.

Figure 6:
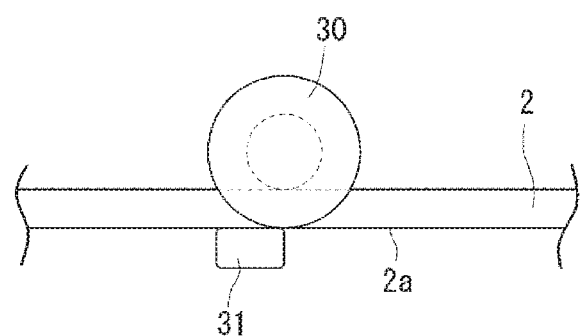
FIG. 6 is a plan view showing a state before a rectangular conductor is bent in an edgewise manner.
Figure 7:
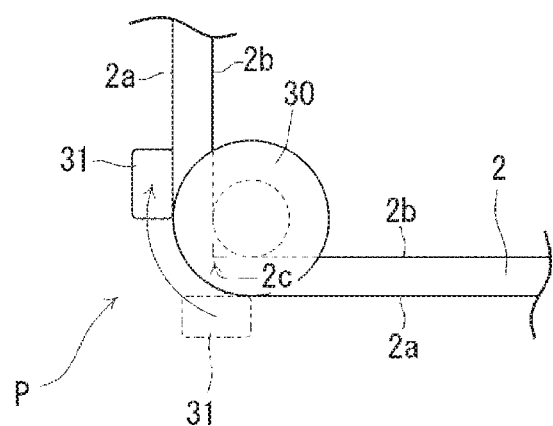
FIG. 7 is a plan view showing a state after the rectangular conductor is bent in the edgewise manner.

FIGS. 6 and 7 are plan views showing edgewise-bending performed by the center post 30 and the bending jig 31. As shown in FIGS. 6 and 7, the edgewise-bending of the rectangular conductor 2 is performed by moving the bending jig 31 around the center of the cylindrical center post 30 along an arcuate path while the rectangular conductor 2 is being clamped by the center post 30. That is, the bending jig 31 edgewise-bends the rectangular conductor 2 by pressing the rectangular conductor 2 in a clockwise direction, which is a predetermined direction, while remaining in contact with an outer side surface 2*a* of the rectangular conductor 2. In this embodiment, since the edgewise coil 1 has a rect-angle-tubular shape, the bending angle of the edgewise-bending is 90 degrees. Therefore, as shown in FIG. 7, in the edgewise-bending of the rectangular conductor 2, the central angle of the arcuate movement of the bending jig 31 is 90 degrees. Note that in practice, in consideration of spring-back of the rectangular conductor 2, the central angle of the arcuate movement of the bending jig 31 may be set to an angle between about 92 degrees and 95 degrees.

Further, in this embodiment, as shown in FIG. 7, the rotation axis of the guide holding member 51 of the guide unit 42 (i.e., the rotation axis 42C of the guide unit 42) coincides with an intersection line 2*c* on which imaginary extension planes of two inner side surfaces 2*b* sandwiching the bent part P at which the rectangular conductor 2 is edgewise-bent intersect each other. The intersection line 2*c* corresponds to the rotation center of the edgewise coil 1 at the time when the rectangular conductor 2 is edgewise-bent. Therefore, it can be considered that the rotation axis of the guide holding member 51 of the guide unit 42 coincides with the rotation center of the edgewise coil 1 at the time when the rectangular conductor 2 is edgewise-bent.

(Operation)

Next, operations of the winding apparatus 23 are described with reference to FIGS. 8 to 16. Among the operations of the winding apparatus 23, how the guide unit 42 prevents the edgewise coil 1 from losing its shape in forming the edgewise coil 1 is described hereinafter in detail. In the following explanation, for the sake of the explanation, the five sway-prevention guides 50 are referred to as a sway-prevention guide 501, a sway-prevention guide 502, a sway-prevention guide 503, a sway-prevention guide 504, and a sway-prevention guide 505, respectively, in a clockwise order in the plan view. Therefore, the sway-prevention guides 501 and 502 are adjacent to each other in the circumferential direction. Similarly, the sway-prevention guides 502 and 503, the sway-prevention guides 503 and 504, the sway-prevention guides 504 and 505, and the sway-prevention guides 505 and 501 are respectively adjacent to each other in the circumferential direction. Further, it is assumed that in each figure, the rectangular conductor 2 is fed (i.e., transferred) toward the center post 30 in a direction indicated by an arrow Q. The edgewise-bending performed by the center post 30 and the bending jig 31 is performed as described above. If necessary, please refer to FIGS. 6 and 7.

Figure 8:
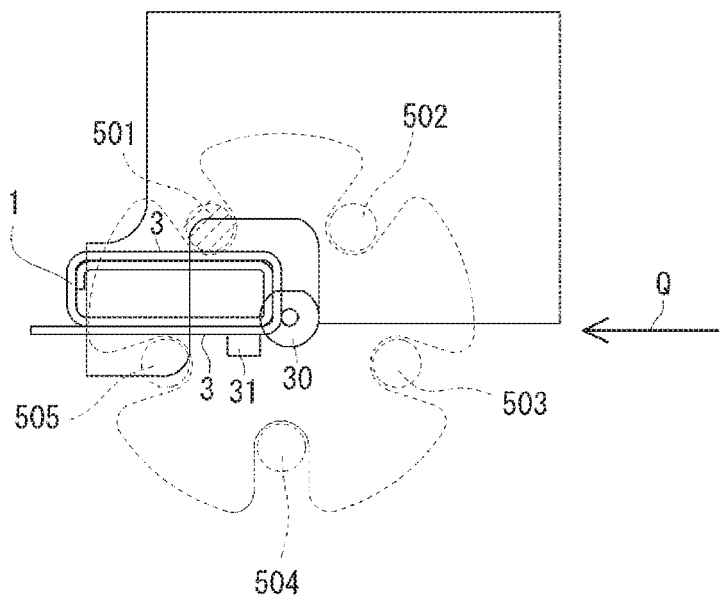
FIG. 8 is a diagram for explaining a mechanism for preventing an edgewise coil from losing its shape in forming the edgewise coil.

FIG. 8 shows a state in which the edgewise coil 1 is positioned on the left side of the center post 30 (the side farther from the holding apparatus 22) and the long-side outer side surfaces 3 of the edgewise coil 1 are parallel to the arrow Q. In this state, the edgewise coil 1 is sandwiched between the sway-prevention guides 501 and 505. The sway-prevention guides 501 and 505 are opposed to and able to come into contact with the two long-side outer side surfaces 3 of the edgewise coil 1, respectively.

Figure 9:
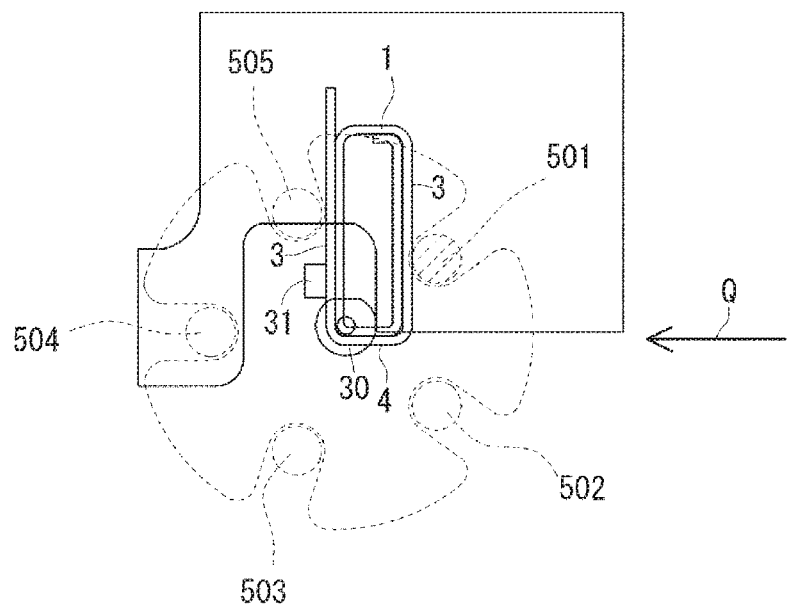
FIG. 9 is a diagram for explaining the mechanism for preventing the edgewise coil from losing its shape in forming the edgewise coil.

In this state, the bending jig 31 is rotationally driven by 90 degrees in the clockwise direction. At the same time, the guide holding member 51 is rotationally driven by 90 degrees in the clockwise direction. As a result, the rectangular conductor 2 is edgewise-bent by 90 degrees in the clockwise direction and, as shown in FIG. 9, the edgewise coil 1 rotates by 90 degrees in the clockwise direction while remaining sandwiched between the sway-prevention guides 501 and 505. After that, the bending jig 31 is rotationally driven so that it returns to the position in which the bending jig 31 was positioned before the rotational driving.

Figure 10:
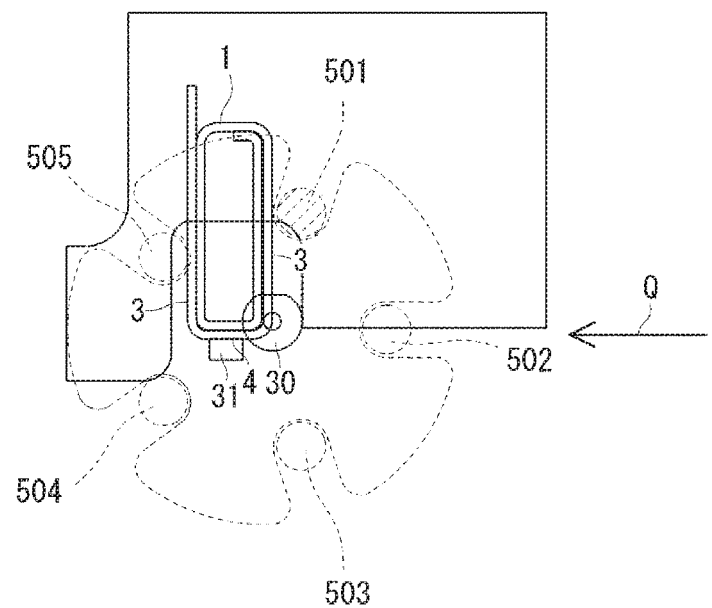
FIG. 10 is a diagram for explaining the mechanism for preventing the edgewise coil from losing its shape in forming the edgewise coil.

Next, as shown in FIG. 10, the rectangular conductor 2 is fed (i.e., transferred) by an amount corresponding to the length of the short-side outer side surface 4 in the direction indicated by the arrow Q. At the same time, the guide holding member 51 is rotationally driven slightly in the counterclockwise direction. As a result, the edgewise coil 1 is positioned on the left side of the center post 30 (the side farther from the holding apparatus 22) while remaining sandwiched between the sway-prevention guides 501 and 505.

Figure 11:
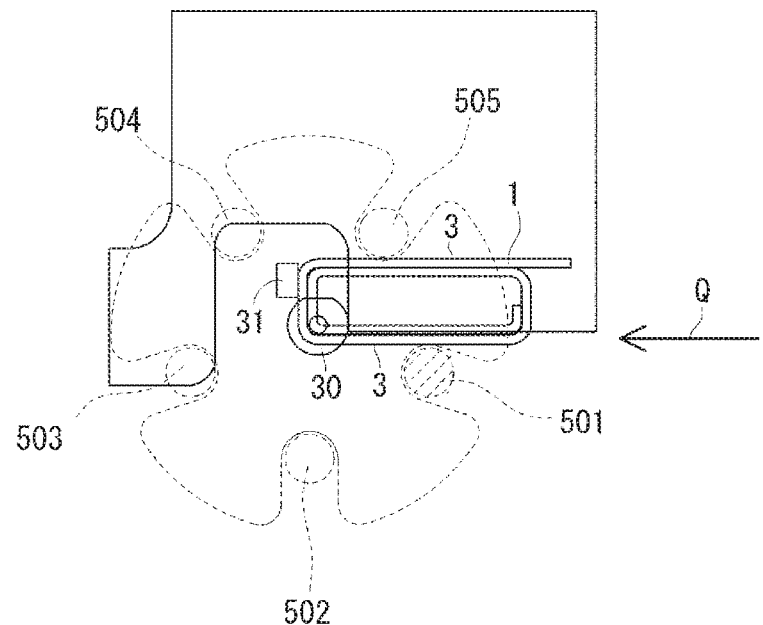
FIG. 11 is a diagram for explaining the mechanism for preventing the edgewise coil from losing its shape in forming the edgewise coil.

Next, the bending jig 31 is rotationally driven by 90 degrees in the clockwise direction. At the same time, the guide holding member 51 is rotationally driven by 90 degrees in the clockwise direction. As a result, the rectangular conductor 2 is edgewise-bent by 90 degrees in the clockwise direction and, as shown in FIG. 11, the edgewise coil 1 rotates by 90 degrees in the clockwise direction while remaining sandwiched between the sway-prevention guides 501 and 505. After that, the bending jig 31 is rotationally driven so that it returns to the position in which the bending jig 31 was positioned before the rotational driving.

Figure 12:
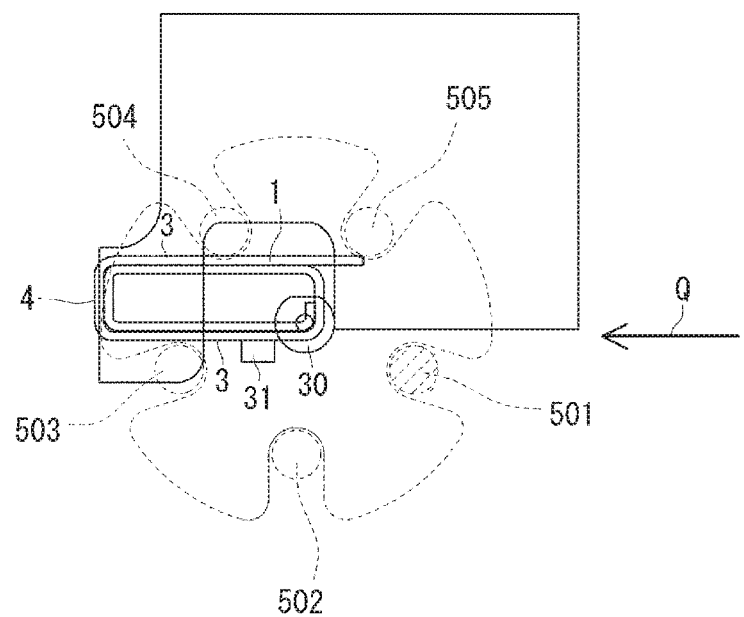
FIG. 12 is a diagram for explaining the mechanism for preventing the edgewise coil from losing its shape in forming the edgewise coil.

Next, as shown in FIG. 12, the rectangular conductor 2 is fed (i.e., transferred) by an amount corresponding to the length of the long-side outer side surface 3 in the direction indicated by the arrow Q. In this process, the guide holding member 51 does not rotate. As a result, the edgewise coil 1 comes out of the position between the sway-prevention guides 501 and 505 and is inserted between the sway-prevention guides 503 and 504. As a result, the edgewise coil 1 is positioned on the left side of the center post 30 (the side farther from the holding apparatus 22) and the long-side outer side surfaces 3 of the edgewise coil 1 become parallel to the arrow Q. Note that there is a possibility that when the edgewise coil 1 is inserted between the sway-prevention guides 503 and 504, the short-side outer side surface 4 of the edgewise coil 1 could collide with the sway-prevention guide 503 or 504. However, even if they collide with each other, the sway-prevention guide 503 or 504 retreats in the radially-outward direction. Therefore, the gap between the sway-prevention guides 503 and 504 becomes temporarily and substantially wider, so that the edgewise coil 1 is smoothly inserted between the sway-prevention guides 503 and 504 without a hitch.

Figure 13:
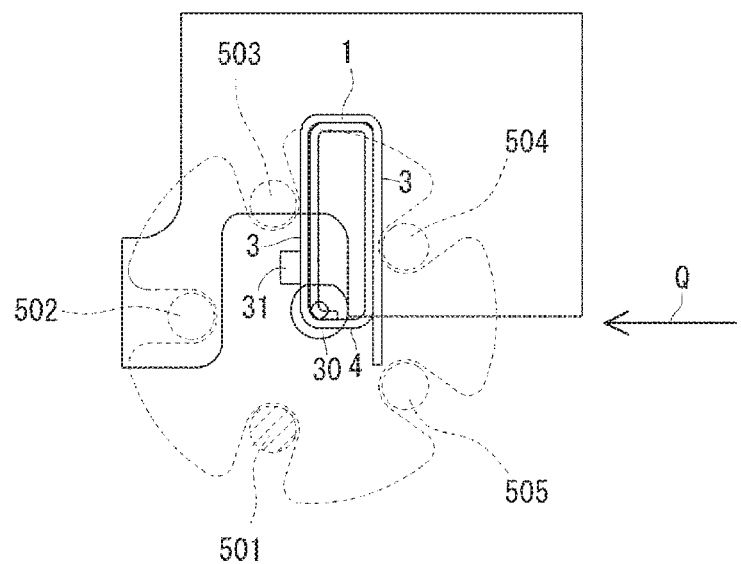
FIG. 13 is a diagram for explaining the mechanism for preventing the edgewise coil from losing its shape in forming the edgewise coil.

Next, the bending jig 31 is rotationally driven by 90 degrees in the clockwise direction. At the same time, the guide holding member 51 is rotationally driven by 90 degrees in the clockwise direction. As a result, the rectangular conductor 2 is edgewise-bent by 90 degrees in the clockwise direction and, as shown in FIG. 13, the edgewise coil 1 rotates by 90 degrees in the clockwise direction while remaining sandwiched between the sway-prevention guides 503 and 504. After that, the bending jig 31 is rotationally driven so that it returns to the position in which the bending jig 31 was positioned before the rotational driving.

Figure 14:
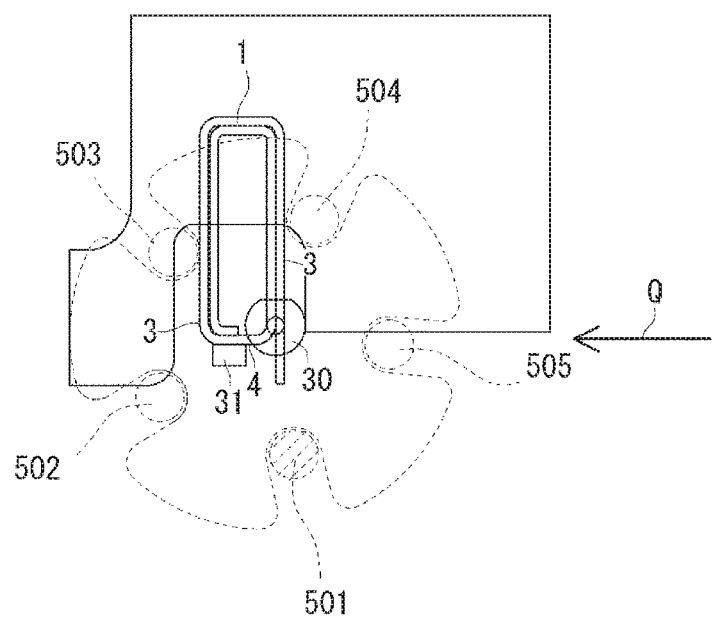
FIG. 14 is a diagram for explaining the mechanism for preventing the edgewise coil from losing its shape in forming the edgewise coil.

Next, as shown in FIG. 14, the rectangular conductor 2 is fed (i.e., transferred) by an amount corresponding to the length of the short-side outer side surface 4 in the direction indicated by the arrow Q. At the same time, the guide holding member 51 is rotationally driven slightly in the counterclockwise direction. As a result, the edgewise coil 1 is positioned on the left side of the center post 30 (the side farther from the holding apparatus 22) while remaining sandwiched between the sway-prevention guides 503 and 504.

Figure 15:
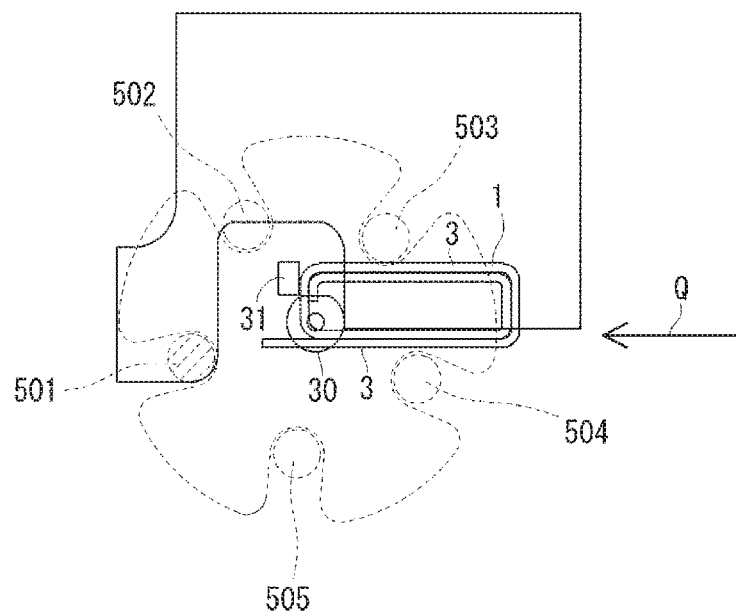
FIG. 15 is a diagram for explaining the mechanism for preventing the edgewise coil from losing its shape in forming the edgewise coil.

Next, the bending jig 31 is rotationally driven by 90 degrees in the clockwise direction. At the same time, the guide holding member 51 is rotationally driven by 90 degrees in the clockwise direction. As a result, the rectangular conductor 2 is edgewise-bent by 90 degrees in the clockwise direction and, as shown in FIG. 15, the edgewise coil 1 rotates by 90 degrees in the clockwise direction while remaining sandwiched between the sway-prevention guides 503 and 504. After that, the bending jig 31 is rotationally driven so that it returns to the position in which the bending jig 31 was positioned before the rotational driving.

Figure 16:
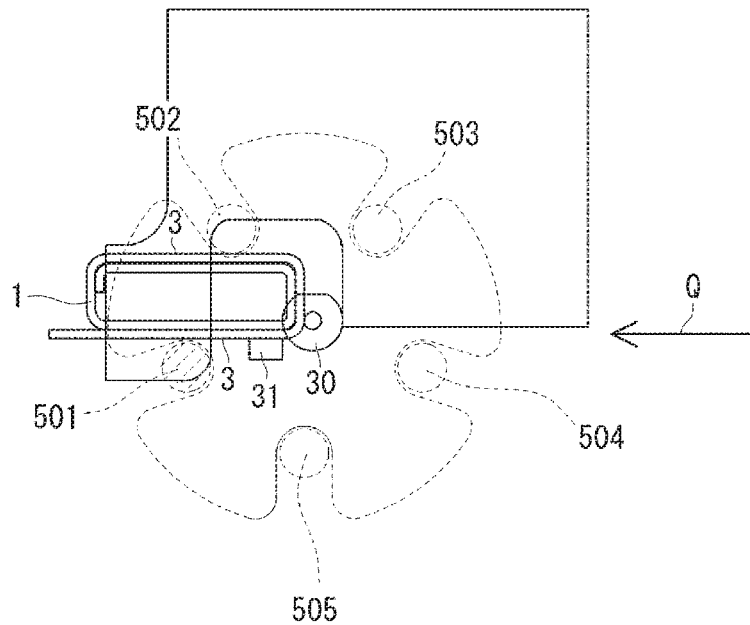
FIG. 16 is a diagram for explaining the mechanism for preventing the edgewise coil from losing its shape in forming the edgewise coil.

Next, as shown in FIG. 16, the rectangular conductor 2 is fed (i.e., transferred) by an amount corresponding to the length of the long-side outer side surface 3 in the direction indicated by the arrow Q. In this process, the guide holding member 51 does not rotate. As a result, the edgewise coil 1 comes out of the position between the sway-prevention guides 503 and 504 and is inserted between the sway-prevention guides 501 and 502. As a result, the edgewise coil 1 is positioned on the left side of the center post 30 (the side farther from the holding apparatus 22).

As described above, while the edgewise coil 1 makes one complete rotation, the guide unit 42 makes a ⅘ rotation (i.e., a four fifths rotation). In this sense, it can also be considered that the feature that the guide unit 42 includes the five sway-prevention guides 50 is rational.

Preferred embodiments of the present application have been described above. The above-described embodiments have the following features.

That is, the winding apparatus 23 forms a rectangle-tubular edgewise coil 1 by alternately repeating bending of a rectangular conductor 2 in a clockwise direction in a plan view (in a predetermined direction) in an edgewise manner and feeding of the rectangular conductor 2. The winding apparatus 23 includes: a bending jig 31 disposed so as to be able to come into contact with a long-side outer side surface 3 (an outer side surface) or a short-side outer side surface 4 (an outer side surface) of the rectangular conductor 2, the bending jig 31 being configured to be driven in the clockwise direction and thereby to bend the rectangular conductor 2 in the edgewise manner; five sway-prevention guides 50 arranged at regular intervals on the same circumference to prevent the edgewise coil 1 from losing its shape, the five sway-prevention guides 50 being configured so that when the rectangular conductor 2 is bent in the edgewise manner, the edgewise coil 1 is sandwiched between two adjacent ones of the five sway-prevention guides 50 in the clockwise direction; and a guide holding member 51 configured to hold the five sway-prevention guides 50 and to be rotationally driven in synchronization with the bending of the rectangular conductor 2 in the edgewise manner and the feeding of the rectangular conductor 2. According to the above-described configuration, when the rectangular conductor 2 is bent in the edgewise manner, a gap between the two sway-prevention guides 50 sandwiching the edgewise coil 1 therebetween in the clockwise direction is small. Therefore, it is possible to effectively prevent the edgewise coil 1 from losing its shape in forming the edgewise coil 1.

Further, the edgewise coil 1 has two long-side outer side surfaces 3 and two short-side outer side surfaces 4 as its outer side surfaces. When the rectangular conductor 2 is bent in the edgewise manner, the two sway-prevention guides 50 are opposed to and able to come into contact with the two long-side outer side surfaces 3 of the edgewise coil 1. According to the above-described configuration, it is possible to prevent the edgewise coil 1 from losing its shape more effectively in forming the edgewise coil 1.

Further, as shown in FIGS. 11 and 12, for example, when the rectangular conductor 2 is fed along the long-side outer side surface 3 of the edgewise coil 1, the edgewise coil 1 is inserted between other two sway-prevention guides 50 (sway-prevention guides 503 and 504) different from the two sway-prevention guides 50 (sway-prevention guides 501 and 505) that had sandwiched the edgewise coil 1 therebetween before the feeding.

Further, as shown in FIGS. 11 and 12, for example, when the rectangular conductor 2 is fed along a long-side outer side surface 3 of the edgewise coil 1, the edgewise coil 1 is inserted between other two sway-prevention guides (sway-prevention guides 503 and 504) that are adjacent in a counterclockwise direction opposite to the clockwise direction to the two sway-prevention guides (sway-prevention guides 501 and 505) that had sandwiched the edgewise coil 1 therebetween before the feeding.

Further, each of the sway-prevention guides 50 is configured so as to be able to retract in a radially-outward direction. According to the above-described configuration, in FIGS. 11 and 12, when the rectangular conductor 2 is fed along the long-side outer side surface 3 of the edgewise coil 1, the edgewise coil 1 is smoothly inserted between the other two sway-prevention guides (sway-prevention guides 503 and 504) without a hitch. Further, in the configuration in which each of the sway-prevention guides 50 can retreat in the radially-outward direction, each of the sway-prevention guides 50 cannot move in the circumferential direction. Therefore, this configuration does not hamper the effect of effectively preventing the edgewise coil 1 from losing its shape in forming the edgewise coil 1.

Further, as shown in FIG. 5, each of the sway-prevention guides 50 is configured so as to be able to swing in the radially-outward direction and thereby to retract in the radially-outward direction.

Further, the winding apparatus 23 further includes a compression coil spring 57 as returning means for returning each of the sway-prevention guides 50 from a state in which it has swung in the radially-outward direction. According to the above-described configuration, after the edgewise coil 1 is inserted between two sway-prevention guides 50 adjacent to each other in the circumferential direction, the gap between these two adjacent sway-prevention guides 50 automatically becomes narrower. Therefore, in the current and subsequent processes, it is possible to prevent the edgewise coil 1 from losing its shape without a hitch in forming the edgewise coil 1.

Further, the rotation axis of the guide holding member 51 (i.e., the rotation axis 42C of the guide unit 42) coincides with an intersection line 2c on which imaginary extension planes of two inner side surfaces 2b sandwiching a bent part P at which the rectangular conductor 2 is bent in the edgewise manner intersect each other. According to the above-described configuration, since the rotation center of the edgewise coil 1 coincides with the rotation center of the guide unit 42, the rotation operation of the guide unit 42 is simplified as compared to the case where they do not coincide with each other.

Preferred embodiments according to the present disclosure have been described above. However, the above-described embodiments can be modified as follows.

That is, in the above-described embodiments, each of the sway-prevention guides 50 swings in the radially-outward direction and hence can retract in the radially-outward direction. However, instead of this configuration, each of the sway-prevention guides 50 may perform parallel translation (i.e., move on a straight line) in the radially-outward direction and hence can retract in the radially-outward direction.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A winding apparatus configured to form a rectangle-tubular edgewise coil by alternately repeating bending of a rectangular conductor in a predetermined direction in an edgewise manner and feeding of the rectangular conductor, comprising:

a bending jig disposed so as to be able to come into contact with an outer side surface of the rectangular conductor, the bending jig being configured to be driven in the predetermined direction and thereby to bend the rectangular conductor in the edgewise manner;

five sway-prevention guides arranged at regular intervals on a same circumference to prevent the edgewise coil from losing its shape, the five sway-prevention guides being configured so that when the rectangular conductor is bent in the edgewise manner, the edgewise coil is sandwiched between two adjacent ones of the five sway-prevention guides in the predetermined direction; and a guide holding member configured to hold the five sway-prevention guides and to be rotationally driven in synchronization with the bending of the rectangular conductor in the edgewise manner and the feeding of the rectangular conductor, wherein the edgewise coil has two long-side surfaces and two short-side outer side surfaces as its outer side surfaces, and wherein when the rectangular conductor is bent in the edgewise manner, two sway-prevention guides are opposed to and able to come into contact with the two long-side outer side surfaces of the edgewise coil.

2. The winding apparatus according to claim 1, wherein when the rectangular conductor is fed along a long-side outer side surface of the edgewise coil, the edgewise coil is inserted between other two sway-prevention guides different from the two sway-prevention guides that had sandwiched the edgewise coil therebetween before the feeding.

3. The winding apparatus according to claim 1, wherein when the rectangular conductor is fed along a long-side outer side surface of the edgewise coil, the edgewise coil is inserted between other two sway-prevention guides that are adjacent in a direction opposite to the predetermined direction to the two sway-prevention guides that had sandwiched the edgewise coil therebetween before the feeding.

4. The winding apparatus according to claim 2, wherein each of the sway-prevention guides is configured so as to be able to retract in a radially-outward direction.

5. The winding apparatus according to claim 4, wherein each of the sway-prevention guides is configured so as to be able to swing in the radially-outward direction and thereby to retract in the radially-outward direction.

6. The winding apparatus according to claim 5, further comprising returning means for returning each of the sway-prevention guides from a state in which it has swung in the radially-outward direction.

7. The winding apparatus according to claim 1, wherein a rotation axis of the guide holding member coincides with an intersection line on which imaginary extension planes of two inner side surfaces sandwiching a bent part at which the rectangular conductor is bent in the edgewise manner intersect each other.

* * * * *